US006169943B1

(12) United States Patent
Simon et al.

(10) Patent No.: US 6,169,943 B1
(45) Date of Patent: Jan. 2, 2001

(54) MOTOR VEHICLE DIAGNOSTIC SYSTEM USING HAND-HELD REMOTE CONTROL

(75) Inventors: Marc R. Simon, Whitefish Bay, WI (US); Francois Lhomme, Wolfisheim; Christophe Leligne, Wolxheim, both of (FR)

(73) Assignee: Eaton Corporation, Cleveland, OH (US)

( * ) Notice: Under 35 U.S.C. 154(b), the term of this patent shall be extended for 0 days.

(21) Appl. No.: 09/354,366

(22) Filed: Jul. 14, 1999

(51) Int. Cl.$^{7}$ .......................... G01M 17/00; G06F 7/00; G06F 19/00

(52) U.S. Cl. .......................... 701/29; 701/30; 701/115; 340/901

(58) Field of Search .......................... 701/29, 30, 115, 701/33, 36; 340/901, 500

(56) References Cited

U.S. PATENT DOCUMENTS 4,853,850 * 8/1989 Krass, Jr. et al. .
5,003,476 * 3/1991 Abe .......................... 701/33
5,003,477 * 3/1991 Abe et al. .......................... 701/33
5,050,080 * 9/1991 Abe .......................... 701/35
5,214,582 * 5/1993 Gray .
5,227,766 * 7/1993 Endo .......................... 340/635
5,276,619 * 1/1994 Ohara et al. .......................... 701/35
5,479,347 * 12/1995 Oguro et al. .......................... 701/35
5,506,773 * 4/1996 Takaba et al. .......................... 701/29
5,541,840 * 7/1996 Gurne et al. .......................... 701/33
5,555,498 * 9/1996 Berra et al. .......................... 701/33
5,565,856 * 10/1996 Takaba et al. .......................... 340/825.16
5,590,040 * 12/1996 Abe et al. .......................... 701/35
5,646,865 * 7/1997 Alfaro et al. .......................... 701/29
5,696,676 * 12/1997 Takaba .......................... 701/31
5,884,202 * 3/1999 Arjomand .......................... 701/29
5,987,394 * 11/1999 Takakura et al. .......................... 702/123

* cited by examiner

*Primary Examiner*—William A. Cuchlinski, Jr.
*Assistant Examiner*—Olga Hernandez
(74) *Attorney, Agent, or Firm*—Quarles & Brady; George E. Haas

(57) ABSTRACT

A vehicle has a memory which stores operational data regarding the vehicle's performance. When the vehicle malfunctions the operational data can be transmitted from a control circuit in the vehicle by a radio frequency signal using the Digital Enhanced Cordless Telecommunications protocol. That radio frequency signal is received at a telephone and the operational recovered. The telephone transfers the operational data via a telephone network to diagnostic computer system which analyzes the operational data to diagnose the cause of the malfunction. The results of the diagnose can be transmitted back to the vehicle.

13 Claims, 2 Drawing Sheets

MOTOR VEHICLE DIAGNOSTIC SYSTEM USING HAND-HELD REMOTE CONTROL

BACKGROUND OF THE INVENTION

The present invention relates to systems for remotely controlling access to motor vehicles; and to systems for transmitting operational information from a motor vehicle to remote diagnostic equipment.

Motor vehicles are controlled by on-board computers which store data regarding operation of the engine and other components on the vehicle. When the motor vehicle is taken to a repair facility for servicing, a vehicle analyzer computer system can be connected by a cable to the on-board computers. This enables the stored data to be transferred from vehicle to the analyzer computer system for electronic diagnosis of the motor vehicle operating problems.

Although sophisticated diagnosis can be performed by such vehicle analyzer computer systems, that diagnosis may be carried out only after the vehicle has been taken to the repair facility. Nevertheless, there are times when the vehicle is not capable of being driven and it is desirable to perform the diagnosis at a location that is remote from a repair facility.

Automobiles have other electronic systems, such as remote keyless entry (RKE) systems that use a small radio frequency (RF) transmitter to initiate various vehicle functions. This RF transmitter, often having the shape of a key ring fob, has a number of push button switches allowing the driver to control functions, such as lock and unlock the doors, arm a security system or open the trunk. These transmitters also have been proposed to control starting the vehicle engine. When a given push button switch is operated, the transmitter sends an RF signal which carries a digital identification code and a designation of the function to be performed. A receiver in the vehicle receives the transmitter signal, verifies that the identification code designates an authorized transmitter for that particular vehicle and if so, signals the vehicle control circuits to perform the prescribed function.

Although the identification code provides security against unauthorized persons gaining access to the motor vehicle, concern has been expressed that someone with a radio receiver and a digital signal analyzer could eavesdrop on the radio transmissions and obtain the security numbers. Particular brands of vehicles use a specific single radio frequency. Thus a thief could "stake out" a valuable vehicle to await the return of the driver and learn the transmission necessary to operate the vehicle. Those security numbers then could be utilized to steal that vehicle at a later point in time. Thus, as the technology available to thieves advances, so too must the signal processing employed by the RKE system. Therefore, there exists a need for a more secure radio frequency system that allows remote control of vehicle functions.

Bidirectional radio frequency communication has been used for some time in cordless telephones. The term "cordless telephone" as used in the telecommunication industry, means a telephone comprising a base station and a hand-held transceiver unit. The base station is connected by wires to a terrestrial telephone line serving the owner's premises. A hand-held transceiver carried by the user communicates by radio frequency signals with the single base station that is up to approximately 300 meters away.

The Digital Enhanced Cordless Telecommunications (DECT) protocol was developed in the mid-1980's as a pan-European standard for cordless telephones and has been adapted for use outside the European Union. The DECT standard protocol has been used for simultaneous bidirectional communication between a base station and a hand-held transceiver of cordless telephones. This standard utilizes ten frequencies for communication. The exchange of signals over each frequency is divided into frames 10 each having twenty-four slots as shown in FIG. 1. The twelve slots in the first half 14 of each frame are used for communication from a hand-held transceiver to the associated base station, while the twelve slots in the second frame half 16 are used for communication from the base station and the hand-held transceiver. It should be noted that different regions of the world have implemented the DECT protocol is slightly different manners. For example, in some regions the frequencies and the number of time slots in each message frame may differ.

When a user desires to use activates the cordless telephone to make an outgoing call, the hand-held transceiver searches for a frequency that has a matching slots in each frame half which are not being used by another cordless telephone system. This is accomplished by the hand-held transceiver listening for digital signals being sent in each slot of the frame at each of the assigned frequencies. When a vacant pair of slots, such as 18 and 19, is found, the hand-held transceiver sends a message initiation signal on the selected frequency during slot 18 in the first half of a message frame.

While the hand-held transceiver is performing these functions, the base station is scanning the ten frequencies and listening during each of the twelve slots in the first half 14 of the message frames at each frequency. When the base station hears a message initiation signal that is addressed to it, i.e. containing the proper identification data, the base station sends a response to the transceiver in the associated slot 19 in the second half of a frame at the same frequency and bidirectional communication is established. A reverse procedure occurs when the base station receives an incoming call via the terrestrial telephone line.

SUMMARY OF THE INVENTION

A general object of the present invention is to provide a system for remotely diagnosing malfunctions of a motor vehicle.

Another object is to provide a communication link for transmitting operational data from a motor vehicle to a remotely located diagnostic computer system.

A further object of the present invention is to provide a wireless communication link.

Still another object is to utilize a hand-held, wireless remote control, of the type used to lock and unlock doors of the motor vehicle, to relay operational data to the diagnostic computer system.

These and other objectives are satisfied by a method for diagnosing a problem in a vehicle which has a memory that stores operational data regarding the vehicle's performance. When the vehicle malfunctions, a control circuit transmits that operational data from the vehicle. Preferably the operational data is transmitted by a radio frequency signal using the Digital Enhanced Cordless Telecommunications protocol.

The operational data is received at a telephone which transfers the operational data via a common carrier communication network from the cordless telephone to a diagnostic computer system. The diagnostic computer system analyzing the operational data to diagnose the problem in the vehicle.

In the preferred method, the results of the diagnostic analysis is transferred from the computer system to the telephone via the telephone network. Then, the telephone transmits the results to the control circuit in the vehicle. The control circuit may present the results to a person at the vehicle or the results can cause the control circuit to take corrective action.

DETAILED DESCRIPTION OF THE INVENTION

Figure 1:
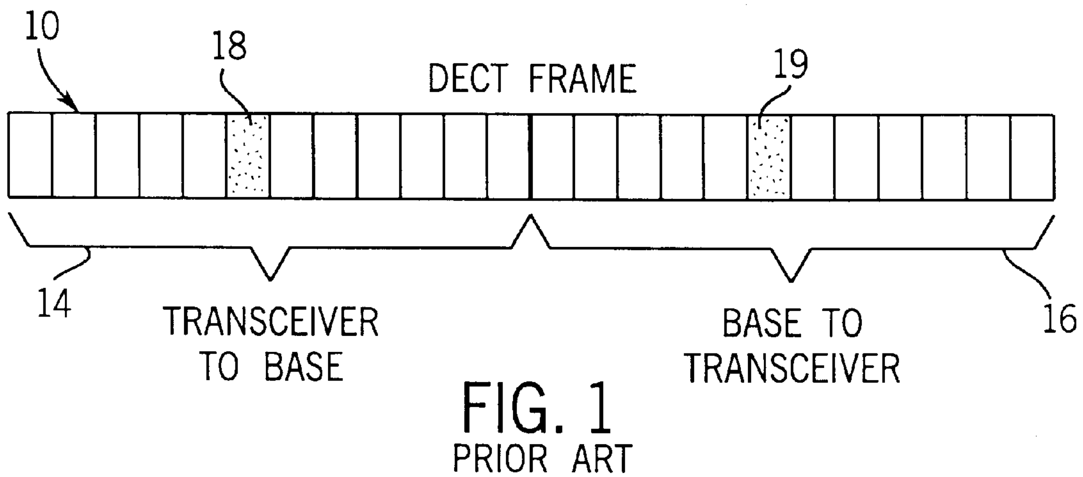
FIG. 1 PRIOR ART
FIG. 1 depicts a message frame of the well-known Digital Enhanced Cordless Telecommunications (DECT) wireless telephone protocol.
Figure 2:
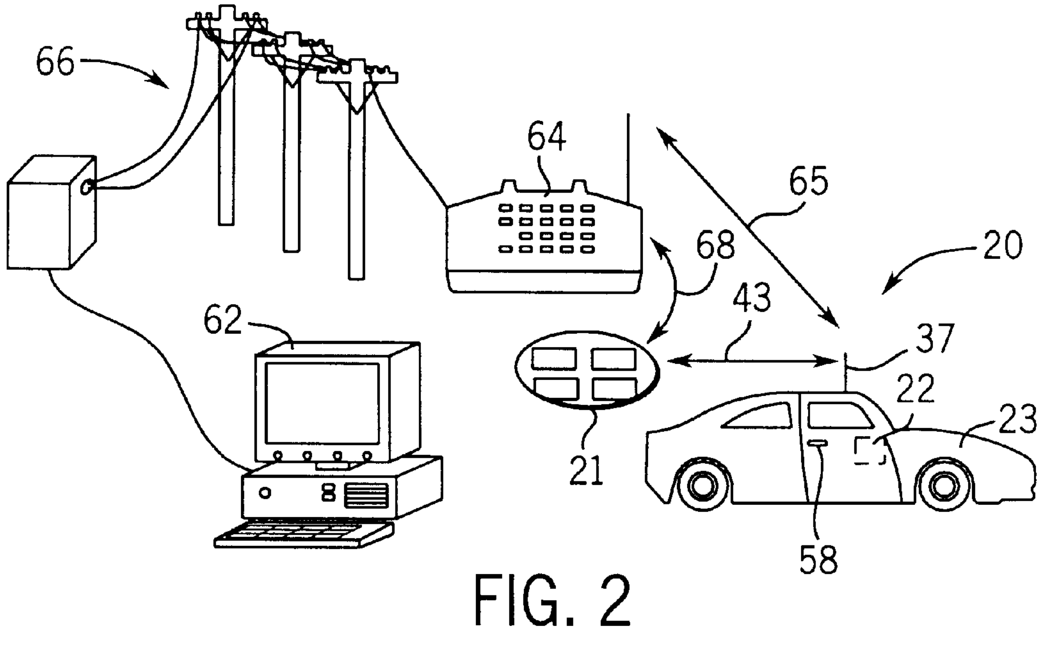
FIG. 2 is a pictorial diagram of a wireless communication system for a motor vehicle according to the present invention.

With initial reference to FIG. 2, a keyless motor vehicle control system 20 comprises a driver's remote control 21, which preferably has the form of a key ring fob carried by a driver, and a control circuit 22 located in the motor vehicle 23. As will be described, the remote control 21 exchanges a radio frequency signals with the control circuit 22, which responds by activating designated functions of the motor vehicle 23.

Figure 3:
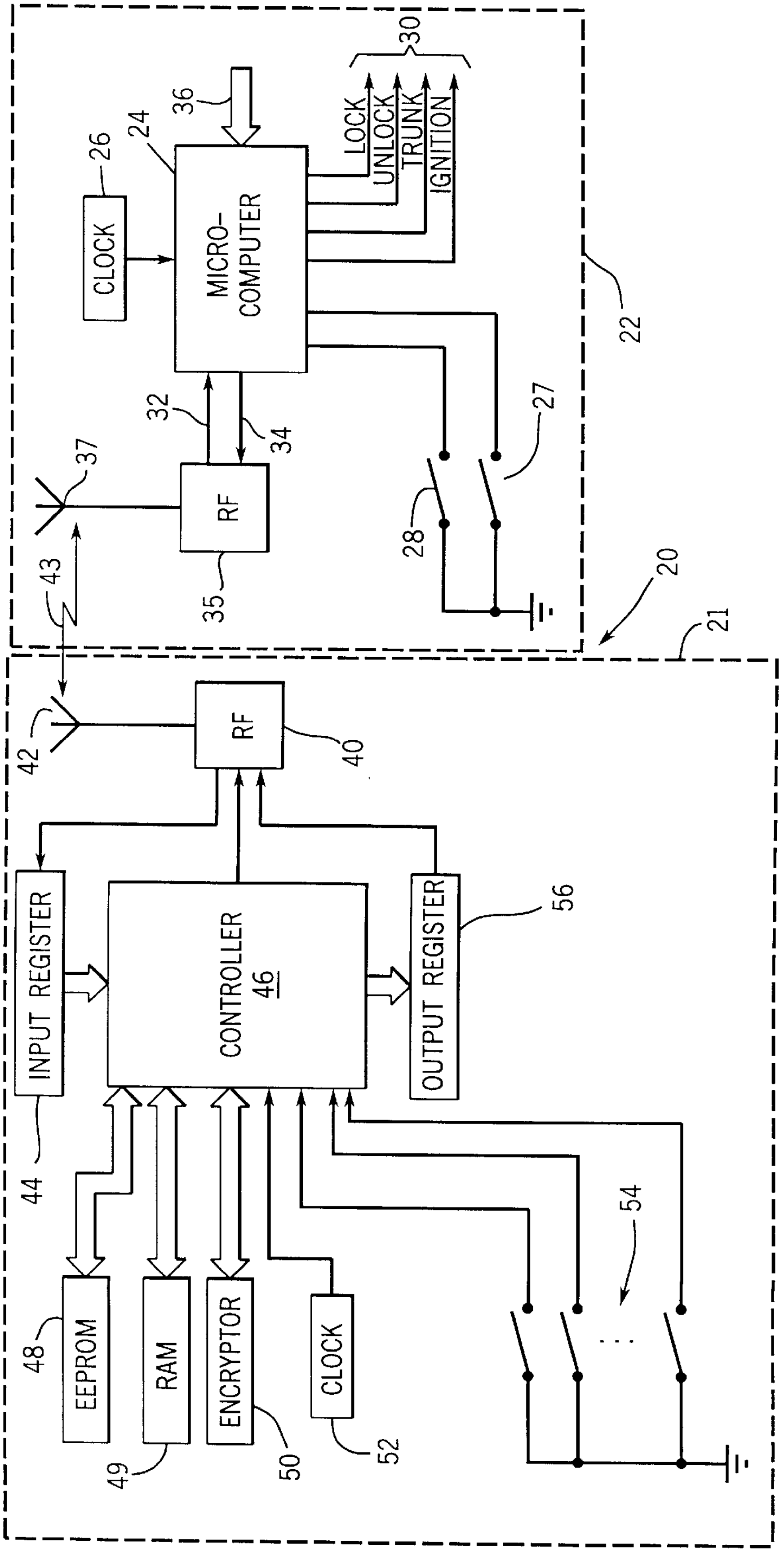
FIG. 3 is a block schematic diagram of a portion of the wireless communication system.

As shown in detail in FIG. 3, the control circuit 22 in the motor vehicle includes a microcomputer 24 with an internal microprocessor, memory in which the control program and data are stored, and input/output circuits. A standard clock circuit 26 supplies timing pulses to the microcomputer 24. The service technician is able to place the microcomputer into different functional modes by operating a manual input switch 27. A port of the microcomputer 24 may also be provided to connect a programming device, such as a keyboard or portable computer, for configuring the control circuit 22. Alternatively, configuration of the control circuit 22 can be performed by downloading data via the radio frequency link.

The control circuit 22 operates several functions on the motor vehicle, such as locking and unlocking the doors, unlatching the trunk lid, and starting the engine for example. For that functionality, the microcomputer 24 is interfaced to the corresponding actuating devices on the motor vehicle 23. The control circuit 22 also may send commands via a parallel communication bus 36 to other control modules or computers in the motor vehicle 23. In other motor vehicles, microcomputer 24 has individual output lines 30 connected directly to the control devices for the respective functions being operated. Specifically, separate wires may be coupled to actuators which lock and unlock the doors, unlatch the trunk lid and start the engine.

A serial output port 32 and a serial input port 34 of the microcomputer 24 are connected to a first radio frequency transceiver 35 which utilizes the Digital Enhanced Cordless Telecommunications (DECT) standard. In a general sense, the first radio frequency transceiver 35 modulates a standard RF frequency carrier with the serial digital data received from output port 32 and transmits that modulated radio frequency signal via an antenna 37. The first transceiver 35 also receives and demodulates radio frequency signals received by the antenna 37 to recover serial digital data carried by that signal. The recovered data is sent to the microcomputer input port 34.

The first transceiver 35 of the control circuit 22 is designed to communicate with a second radio frequency transceiver 40 and antenna 42 both located within the remote control 21. As will be described, both transceivers 40 and 35 utilize the DECT protocol and are similar to devices found in cordless telephones. The second transceiver 40 has a receiver section which demodulates the received radio frequency signal to recover digital data carried by that signal and the recovered data is sent in a serial format to an input register 44. The input register 44 converts the serial data stream from the second transceiver 40 into a parallel format which is read by a controller 46. The controller 46 may be a hardwired device that sequentially performs the remote control procedure to be described or a programmable device which executes a software program to implement that procedure. The controller 46 of the remote control 12 is connected to an electrically erasable programmable read only memory (EEPROM) 48 which stores configuration and identification data for the remote control. A random access memory 49 also is provided to store information received from the motor vehicle, as will be described. A clock circuit 52 also provides timing signals for the controller 46.

A plurality of user operable switches 54 are connected to different input lines to the controller 46 in order for the driver to select the specific functions to be performed on the motor vehicle. For example, a separate switch can be provided for the functions of unlocking and locking the doors, unlatching the trunk lid, and starting the engine.

The remote control 21 also includes an encrypt or 50 connected to the controller 46 to encrypt a remote control security number for transmission to the control circuit 22. The encrypt or 50 utilizes a secret-key cryptography algorithm to encrypt data for sending to the control circuit. For example, the algorithm specifies a sequence of a plurality of logical operations which are performed on a known seed number and a challenge number received from the control circuit to produce a resultant number for transmission by the remote control. Several cryptography algorithms of this type are described by Mehrdad Foroozesh in an article entitled "Protecting Your Data With Cryptography," *UNIX Review*, November 1996, volume 14, number 12, page 55(6), which description is incorporated herein by reference. Such encryption techniques and algorithms are commonly used to encode computer data being transmitted over common carriers. It should be understood that other encryption techniques may be used.

Digital output data is sent by the controller 46 in parallel form to a parallel-in/serial-out output register 56. The serial data from the output register 56 is applied to the input of a transmitter section in the second transceiver 40 which modulates a radio frequency signal which that data. The resultant RF signal is sent via the antenna 42 to the control circuit 22 in motor vehicle. The components of the remote control are powered by a battery.

When the driver desires the vehicle to perform a given function the corresponding switch 54 on the remote control 21 is pressed. This sends a signal to the controller 46 which responds by obtaining a unique identification number assigned to this particular remote control and stored in the EEPROM 48. The identification number and an indication of the switch 54 that was pressed are sent via output register 56 to the second transceiver 40 from which it is transmitted to the control circuit 22 in the adjacent motor vehicle 23 as seen in FIG. 2.

Referring again to FIG. 3, before a message containing the identification number and switch indication may be sent, the remote control 21 must locate a pair of DECT frame time slots which are not already in use. This process begins by scanning each of the ten DECT frequencies. If the remote control 21 does not hear a message frame on a given frequency, it then forms a new message frame and selects an arbitrary pair of time slots to use. If a particular frequency already is carrying DECT messages, the remote control 21 listens during the message frames for an available pair of frame slots, that is ones which do not already contain message data. If none is found, the next DECT frequency is selected. When available time slots in each half of the message frame are found, the remote control 21 transmits the message in the time slot during the second half of the message frame. The remote control 21 then listens for an acknowledgment in the corresponding time slot during the first half of subsequent frames on the selected frequency.

Receipt of a message frame causes the vehicle control circuit 22, which had been in a "sleep state", to wake-up wherein its microcomputer 24 to begin executing a software routine stored in memory. As noted previously, any of several well known data encryption algorithms may be employed to exchange data between the remote control 21 and the vehicle control circuit 22 for greater security and robustness against interference. Thus the first portion of the communication process may be an exchange of messages according to encryption algorithm which verifies that the remote control is authentic, i.e. authorized to access this motor vehicle 23.

When the remote control 21 has been authenticated, the first microcomputer 24 uses the switch indication received from the remote control 21 to determine the motor vehicle function to activate. For example, when the door unlock function is indicated, an unlock command signal is sent out over either communication bus 36 or one of the dedicated output lines 30 to a control circuit for door locks 58 of the motor vehicle 23 as seen in FIG. 2. Other command signals unlatch the vehicle's trunk or start the engine.

With reference again to FIG. 3, the control circuit in the motor vehicle 23 also may communicate via a cordless telephone base station 64 that is in the vicinity of the vehicle, typically within 300 meters. An RF communication link 65 using the DECT protocol is established between the cordless telephone base station and the motor vehicle control circuit 22. The cordless telephone base station 64 is connected to a common carrier telephone network 66 through which dial-up communication paths may be established with devices connected to that network. For example, cordless telephone base station 64 can dial a computer 62 which has been programed to diagnose the cause of malfunctions in motor vehicles. The computers 62 is similar to those commonly found in motor vehicle service facilities.

This latter communication path is especially useful in transferring historical operating information from the vehicle to a computer system for diagnostic analysis. For example, if the motor vehicle 23 breaks down and can not be operated, the driver or a tow truck operator is able to send that operating information to a computer system at a repair facility for analysis. This enables sophisticated trouble shooting to be performed at a remote location and the problem fixed without taking the vehicle to the repair facility.

Specifically, a nearby cordless telephone base station 64 is employed to dial the repair facility and access the diagnostic computer 62 via the telephone network 66. Alternatively, a cellular telephone with capability to communicate with DECT protocol devices can be used to transfer the historical operating information from the vehicle to the telephone network 66 and thus to diagnostic computer 62. To establish the telephone connection, the person activates a switch 28 on the vehicle control circuit 22. The microcomputer 24 responds to the switch activation by contacting the cordless telephone base station 64 using the DECT protocol similar to that described previously by which the remote control 21 contacted the control circuit 22. However in this case, the control circuit acts as the hand-held transceiver of the cordless telephone.

The control circuit 22 searches the allocated frequencies for an available pair of time slots, such as 18 and 19, to use and then transmits an access signal to the cordless telephone base station 64. Upon receiving that access signal the cordless telephone base station 64 sends a reply to the vehicle control circuit 22 thereby establishing bidirectional communication link 65 in FIG. 2. Next the control circuit sends the telephone number of the diagnostic computer 62 to the base station 64, which responds by dialing that number into the telephone network 66. Once the telephone link has been established, the vehicle control circuit 22 notifies the diagnostic computer 62 of the desire to up-load operational information for analysis. When authorized by the diagnostic computer 62, the vehicle control circuit 22 transmits the information via RF link 65 to the cordless telephone base station 64 which in turn relays the data to the diagnostic computer 62 via the telephone network 66.

In the event that the malfunctioning vehicle is not within range of a cordless telephone base station 64, the remote control 21 can be employed to relay the historical operating data from the vehicle. In this situation upon failing to communicate with a cordless telephone base station 64, the control circuit 22 establishes communication via RF link 43 with the remote control 21 using the DECT protocol as described previously. After that link 43 has been formed, the historical operating information is transmitted from the vehicle 23 to the remote control 21 which stores the data in its RAM 49 in FIG. 3.

Referring again to FIG. 2, the user then carries the remote control 21 to a location of a cordless telephone. At that point, a push-button switch on the remote control 21 is activated which results in contact being made with the base station 64 of the cordless telephone via RF link 68 using the DECT protocol previously described. Next, the remote control instructs the base station to dial the telephone number of the diagnostic computer 62. After that communication path through the telephone network 66 has been established, the vehicle operating data is transmitted from the remote control 21 to the diagnostic computer 62. Alternatively, the remote control 21 can be taken to a service facility and the operating data is downloaded directly into the diagnostic computer 62.

The diagnostic computer 62 then analyzes the operational data in a similar manner as when the vehicle is in the repair facility and connected to the computer by cables. The results of the analysis can be transmitted via the same telecommunication links 66 and 65 to the vehicle 23 where the results are displayed to the driver or tow truck operator on a display connected to the control circuit via communication bus 36 in FIG. 2. Alternatively, a technician at the repair facility can read the results from the screen of the diagnostic computer and communicate them to a person at the vehicle by a conventional telephone voice link using the base station 64 or a cellular telephone.

Alternatively, upon analyzing the operational data, the diagnostic computer 62 may formulate a correction command for curing the problem in the vehicle. The correction command then is transmitted via the same telecommunication links 66 and 65 to the vehicle 23 the control circuit implements the corrective action indicated by the command.

What is claimed is:

1. A method for diagnosing a problem in a vehicle which has a memory that stores operational data regarding the vehicle, that method comprising the steps of:

transmitting the operational data from a control circuit in the vehicle to a remote control for operating devices on the vehicle;

transferring the operational data from the remote control to a cordless telephone;

receiving the operational data at a cordless telephone;

transferring the operational data via a communication network from the cordless telephone to a diagnostic computer system; and analyzing the operational data in the diagnostic computer system to diagnose the problem in the vehicle.

2. The method as recited in claim 1 wherein the step of transmitting the operational data utilizes the Digital Enhanced Cordless Telecommunications protocol.

3. The method as recited in claim 1 wherein the step of transferring the operational data utilizes the Digital Enhanced Cordless Telecommunications protocol.

4. The method as recited in claim 1, wherein the step of transferring the operational data utilizes a telephone network.

5. The method as recited in claim 2 wherein the step of transferring the operational data further comprises commanding the cordless telephone to dial a telephone number assigned to the diagnostic computer system.

6. A method for diagnosing a problem in a vehicle which has a memory that stores operational data regarding the vehicle, that method comprising the steps of:

transmitting the operational data from a control circuit in the vehicle;

receiving the operational data at a cordless telephone;

transferring the operational data via a communication network from the cordless telephone to a diagnostic computer system; and analyzing the operational data in the diagnostic computer system to diagnose the problem in the vehicle;

transferring a diagnosis of the problem in the vehicle from the computer system to the cordless telephone via the communication network;

transmitting the diagnosis from the cordless telephone to the control circuit the vehicle; and presenting the diagnosis to a person at the vehicle.

7. A method for diagnosing a problem in a vehicle which has a memory that stores operational data regarding the vehicle, that method comprising the steps of:

transmitting the operational data from a control circuit in the vehicle;

receiving the operational data at a cordless telephone;

transferring the operational data via a communication network from the cordless telephone to a diagnostic computer system;

analyzing the operational data in the diagnostic computer system to diagnose the problem in the vehicle;

transferring a correction command from the computer system to the cordless telephone via the communication network; and transmitting the correction command from the cordless telephone to the control circuit the vehicle.

8. A method for diagnosing a problem in a vehicle having a memory that stores operational data regarding the vehicle, that method comprising the steps of:

transmitting the operational data from a control circuit in the vehicle by a radio frequency signal using the Digital Enhanced Cordless Telecommunications protocol;

receiving the radio frequency signal at a telephone;

recovering the operational data from the radio frequency signal received at the telephone;

transferring the operational data via a telephone network from the telephone to a diagnostic computer system; and analyzing the operational data in the diagnostic computer system to diagnose the problem in the vehicle.

9. The method as recited in claim 8 wherein the step of transferring the operational data further comprises commanding the telephone to dial a telephone number assigned to the diagnostic computer system.

10. The method as recited in claim 8 wherein the step of transferring the operational data comprises transferring the operational data to a remote control for operating devices on the vehicle; and transferring the operational data from the remote control to the telephone.

11. The method as recited in claim 10 wherein the steps of transferring the operational data to and from the remote control utilize the Digital Enhanced Cordless Telecommunications protocol.

12. The method as recited in claim 8 further comprising the steps of:

transferring a diagnosis of the problem in the vehicle from the computer system to the telephone via the telephone network;

transmitting the diagnosis from the telephone to the control circuit in the vehicle; and presenting the diagnosis to a person at the vehicle.

13. The method as recited in claim 8 further comprising the steps of:

transferring a correction command from the computer system to the telephone via the telephone network;

transmitting the correction command from the telephone to the control circuit in the vehicle.

* * * * *